(12) United States Patent
Joannopoulos et al.

(10) Patent No.: US 7,190,853 B2
(45) Date of Patent: Mar. 13, 2007

(54) TUNABLE CHROMATIC DISPERSION COMPENSATION

(75) Inventors: John D. Joannopoulos, Belmont, MA (US); Shanhui Fan, Somerville, MA (US); Michal Lispon, Waltham, MA (US); Kevin M. Chen, Santa Clara, CA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/178,965

(22) Filed: Jun. 25, 2002

(65) Prior Publication Data

US 2003/0030870 A1     Feb. 13, 2003

Related U.S. Application Data

(60) Provisional application No. 60/300,680, filed on Jun. 25, 2001.

(51) Int. Cl.
*G02B 6/26* (2006.01)

(52) U.S. Cl. .................. 385/15; 385/129; 385/130

(58) Field of Classification Search ............. 385/24, 385/27, 39, 14, 15, 129–132
See application file for complete search history.

(56) References Cited

U.S. PATENT DOCUMENTS

| | | | |
|---|---|---|---|
| 5,784,400 A | | 7/1998 | Joannopoulos et al. |
| 6,028,693 A | | 2/2000 | Fork et al. |
| 6,101,300 A | | 8/2000 | Fan et al. |
| 6,683,721 B2 | * | 1/2004 | Copner et al. ............. 359/618 |
| 6,791,758 B1 | * | 9/2004 | Scobey ....................... 359/584 |
| 6,798,553 B1 | * | 9/2004 | Scobey et al. .............. 359/260 |
| 6,865,315 B2 | * | 3/2005 | Hulse ........................... 385/27 |
| 2002/0172456 A1 | * | 11/2002 | Hosomi et al. ............... 385/27 |
| 2002/0176659 A1 | * | 11/2002 | Lei et al. ...................... 385/24 |
| 2003/0087121 A1 | * | 5/2003 | Domash et al. ............. 428/641 |

FOREIGN PATENT DOCUMENTS

| | | |
|---|---|---|
| EP | 1098212 | 5/2001 |
| JP | 08070276 | 3/1996 |

OTHER PUBLICATIONS

"Adjustable dispersion-slope compensator using entirely thin-film coupled-cavity allpass filters in a multi-reflection parallel configuration," Jablonski et al. *Trends in Optics and Photonics Series: Optical iber Communication Conference.* Anaheim, CA. 2001. vol. 54, no month.

"Layered Optical thin-film allpass dispersion equalizer (LOTADE): a novel device compensating for dispersion slope of optical fibers," Jablonski et al. *Pacific Rim Conference Lasers Electro. Opt. Cleo. Tech. Dig. 2000*, no month.

"Layered Optical thin-film allpass dispersion equalizer for compensation of dispersion slope of optical fibres," Jablonski et al. *Electronics Letters*. Jun. 2000. vol. 36, No. 13.

* cited by examiner

*Primary Examiner*—Kevin S. Wood
(74) *Attorney, Agent, or Firm*—Gauthier & Connors LLP

(57) ABSTRACT

A system for dispersion compensation is provided including a plurality of optical cavities with each including a specific resonant frequency and resonant linewidth. At least one coupling element interconnects the optical cavities. The at least one coupling element defines the coupling strength between the cavities. The optical cavities are interconnected with the at least one coupled element that forms a multi-cavity structure. The multi-cavity structure generates appropriate dispersion properties for dispersion compensation purposes.

7 Claims, 5 Drawing Sheets

TUNABLE CHROMATIC DISPERSION COMPENSATION

PRIORITY INFORMATION

This application claims priority from provisional application Ser. No. 60/300,680 filed Jun. 25, 2001.

This invention was made with government support under Grant No. DMR-9808941 awarded by NSF. The government has certain rights in the invention.

BACKGROUND OF THE INVENTION

The invention relates to the field of optical communications, and in particular to chromatic dispersion using optical resonators.

A number of devices have been used for dispersion in communication systems, such as tunable fiber gratings, optical all-pass filters using a ring resonator and virtually imaged phased array devices Tunable fibers can provide high dispersion over large bandwidths, and significant tunability. However, these devices operate in reflection mode that requires an optical circulator to retrieve the reflected signal, which increases the complexity of the device. The optical all-pass filters and the virtually imaged phased array devices exhibit periodic responses, which may not suitable for high bit-rate applications. Also, the all-pass filter designs are based upon a waveguide geometry that tends to exhibit significant polarization mode dispersion, an undesirable characteristics for chromatic dispersion compensation.

SUMMARY OF THE INVENTION

According to one aspect of the invention, there is provided a system for dispersion compensation. The system includes a plurality of optical cavities with each including a specific resonant frequency and resonant linewidth. At least one coupling element interconnects the optical cavities. The at least one coupling element defines the coupling strength between the cavities. The optical cavities are interconnected with the at least one coupled element that forms a multi-cavity structure. The multi-cavity structure generates appropriate dispersion properties for dispersion compensation purposes.

According to another aspect of the invention, there is provided a method for dispersion compensation. The method includes providing a plurality of optical cavities with each including a specific resonant frequency and resonant linewidth. At least one coupling element is provided to interconnect the optical cavities. The at least one coupling element defines the coupling strength between the cavities. Interconnecting the optical cavities with the at least one coupling element form a multi-cavity structure. The method further includes adjusting the overall dispersion of the multi-cavity structure by using certain properties of the optical cavities.

According to another aspect of the invention, there is provided a system for dispersion compensation. The system includes a plurality of multi-cavity structure that receives an electromagnetic signal and the electromagnetic signal is cascaded through the multi-cavity structures to perform dispersion compensation. Each of the multi-cavity structures comprises a plurality of optical cavities with each including a specific resonant frequency and resonant linewidth, and at least one coupling element interconnecting the optical cavities, the at least one coupling element defining the coupling strength between the cavities. The interconnection between the optical cavities forms a structure that permits adjusting the overall dispersion of the structure by using the resonant frequency, resonant linewidth, and the coupling strengths of the optical cavities. The multi-cavity structures are arranged such that no mutual coupling occurs between the multi-cavity structures.

DETAILED DESCRIPTION OF THE INVENTION

The invention provides a technique for dispersion compensation. The technique is based upon the transmission properties of coupled multi-cavity systems, which eliminates the need of optical circulators and results in significant improvement in cost and device sizes.

Figure 1A:
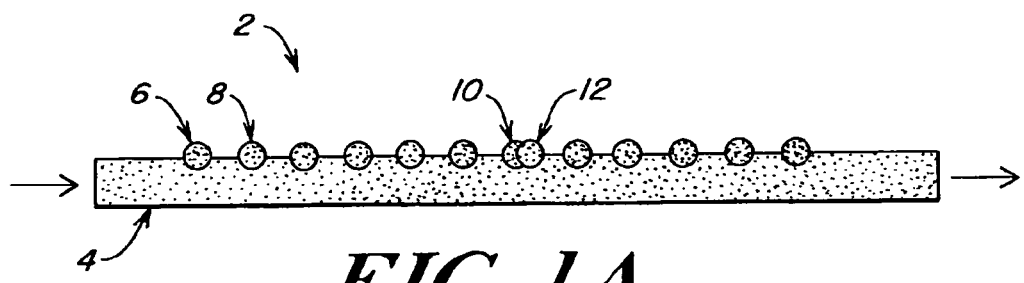
FIGS. 1a–1c are schematic diagrams of optical cavities used in accordance with the invention.
Figure 1B:
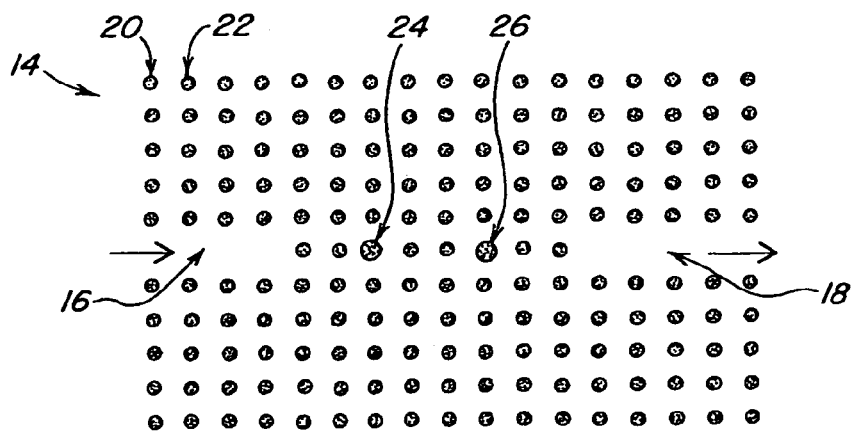
Figure 1C:
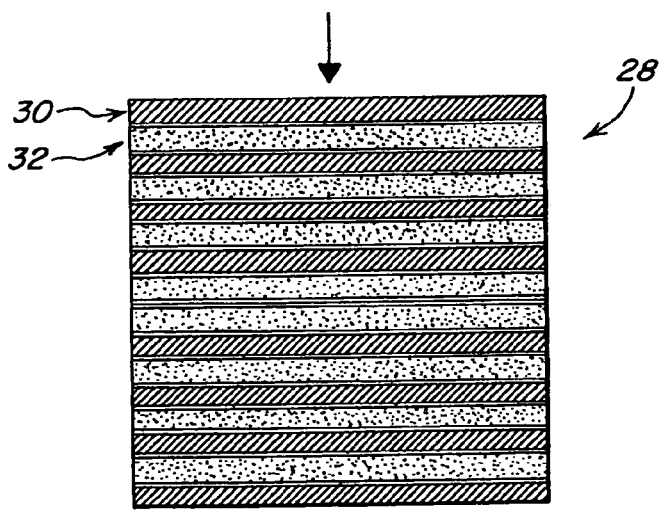

FIGS. 1a–1c are schematic diagrams of optical cavities used in accordance with the invention. FIG. 1a shows an optical cavity 2 that includes a waveguide structure 4, distributed feedback (DFB) grating 6, 8, 10, and 12 on top of the waveguide structure 4. The DFB gratings are used to introduce a phase shift to an electromagnetic signal that enters the waveguide structure 4. The distance between the DFB gratings 6, 8, 10, and 12 can be uniform as shown between grating elements 6 and 8, or it can also be non-uniform or even overlapping as shown between grating elements 10 and 12. The distances between grating elements 6, 8, 10, and 12 establish a cavity structure with a specific phase shift, delay, and dispersion, which occur to the electromagnetic signal that enters the waveguide structure 4.

FIG. 1b shows a photonic crystal structure 14. The photonic crystal structure 14 includes two embedded optical cavities 24 and 26, grating elements 20 and 22, and optical waveguides 16 and 18. The structure 14 applies the same principles discussed above regarding the cavity 2. The grating elements 20 and 22 are integral components of the structure 14. The periodic arrangement of these elements forms a photonic band gap, and confines electromagnetic modes in the cavity region 24 and 26. The cavity modes then provide specific phase shift, delay, and dispersion properties. The optical waveguides 16 and 18 are coupled with cavities 24 and 26. As shown in FIG. 1b, the electromagnetic signal enters the optical waveguide 16 and leaves through the optical waveguide 18. Once leaving through the optical waveguides 18, the electromagnetic signal has incorporated a phase shift, delay, and dispersion that is determined by the cavities 24 and 26 and the coupling strengths between the cavities 24 and 26.

FIG. 1c shows a thin film microcavity 28. The thin film microcavity 28 includes multi-layers 30 and 32 of dielectric mirrors, and the multi-layers 30 and 32 possess different index values. The number of layers can be varied. The microcavity 28 receives an electromagnetic signal. The electromagnetic signal is reflected across the various layers 30 and 32 of the microcavity 28. Given the layers 30 and 32 can have various index contrast values, the electromagnetic signal experiences an overall phase shift, delay, and dispersion. The DFB cavity 2 and photonic crystal structure 14 are attractive for use in accordance with the invention, because of their compact sizes, and the possibility to directly integrate such cavities on a chip. The multi-layer microcavity 28 offers superior coupling to optical fibers. In addition, when light is incident to the normal of incidence direction, an exact degeneracy can occur due to the rotational symmetry of the structure. Thus, the polarization dependency in principle can be completely eliminated.

The invention can also use other types of optical cavities. These optical cavities need to exhibit properties similar to the cavities 2, 14, and 28, discussed above. These properties will be discussed more hereinafter. Using these optical cavities 2, 14, and 28, one can create a dispersion compensation module, which results in significant improvement in costs and device sizes.

Figure 2A:
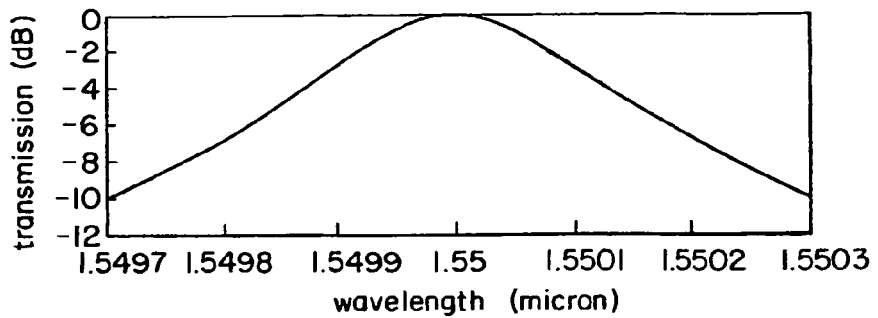
FIGS. 2a–2d are graphs of the properties exhibited by optical cavities used in accordance with the invention.

FIGS. 2a–2d are graphs of the properties exhibited by optical cavities 2, 14, and 28 used in accordance with the invention. While the cavities 2, 14, and 28 are different in structure, they exhibit similar optical properties, as characterized by its transmission function, as discussed hereinafter. A typical transmission function for each of the optical cavities 2, 14, and 28 is shown in FIG. 2a. Each of the optical cavities 2, 14, and 28 transmission function is Lorentzian. In order to achieve high transmission, these optical cavities 2, 14, and 28 need to be symmetric in terms of the optical feedback of the mirrors on both sides of the cavities 2, 14, and 28. The ratio between the resonant wavelength and full width of transmission lineshape at half maximum (FWHM) defines the quality factor Q. In this case, the resonant wavelength, as shown in FIG. 2a, is 1.55 µm, the FWHM in frequency is 25 GHz, and the Q factor is 4,000. Such a Q factor can be achieved in the thin film microcavity 28 using Si and $SiO_2$.

Figure 2B:
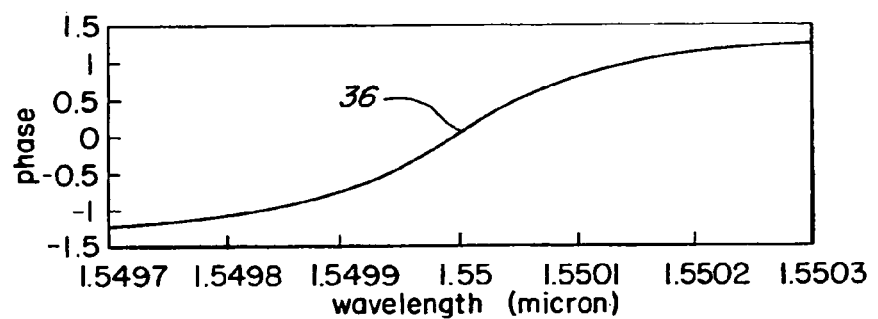

FIG. 2b shows a graph 36, which demonstrates the relationship between phase and wavelength. In particular, the graph 36 defines the phase as a function of wavelength for a single cavity. As the wavelength increases across the resonance, in this case at 1.55 µm, the phase increases from −1.5 µm to 1.5 µm. At resonance, the phase is approximately zero.

Figure 2C:
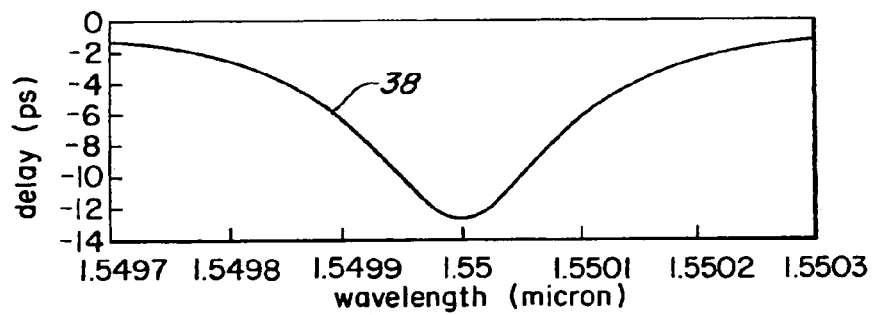

The delay associated with the electromagnetic wave or optical signal through any the of the cavities 2, 14, and 28 is defined as:

$$\tau_{max} = \frac{d\varphi}{d\omega} \qquad \text{Eq. 1}$$

where φ is phase and ω is wavelength. Essentially, the graph 38 of the delay is the derivative of the graph 36 with respect to the frequency, as shown in FIG. 2c.

The delay exhibits a Lorentzian lineshape, and is at its maximum at the resonant frequency, in this case at 1.55 µm. This indicates that at resonance, light will spend a long time in the cavity before it escapes. The delay decreases when a wavelength is further away from the resonant wavelength. In this case, the maximum delay is at 12 ps. For a single cavity, the maximum delay is defined as:

$$\tau_{max} = \frac{QT}{2\pi} \qquad \text{Eq. 2}$$

where T is the optical cycle at the resonant frequency.

Figure 2D:
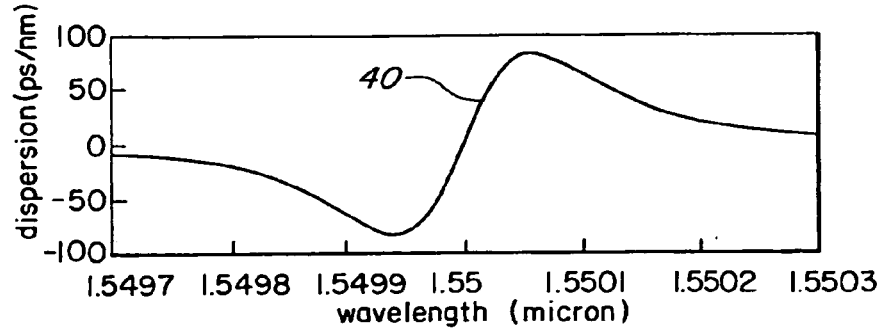

The dispersion of an optical system D is defined as $$D = \frac{d\tau}{d\lambda} \qquad \text{Eq. 3}$$

and is calculated for this system, as shown in FIG. 2d. The graph 38 is the derivative of the graph 36 with respect to frequency. Also, the dispersion is zero at the resonant frequency, and varies from −82 ps/nm to 82 ps/nm, over a wavelength range of approximately 0.1 nm. The maximum dispersion occurs at a wavelength of approximately 1.55009 micron, and the minimum dispersion occurs at a wavelength of 1.54901 micron.

By tuning the frequency of a cavity, while keeping the signal frequency constant, it is then possible to achieve tuning in the dispersion properties. The tuning can be achieved in a variety of different mechanisms, such as through thermal, electrical, or mechanical means.

The Q value defines the optical bandwidth, the dispersion, and delay properties of an optical cavity. The maximum delay scales as Q, while the maximum dispersion scales as $Q^2$. In a single cavity system, increasing the bandwidth as is required by the applications in high-bit rate communications systems, also results in the decrease of dispersion.

As discussed above, other optical cavities can be used in accordance with the invention. These optical cavities should possess the same properties that have been described with reference to FIGS. 2a–2d.

Figure 3:
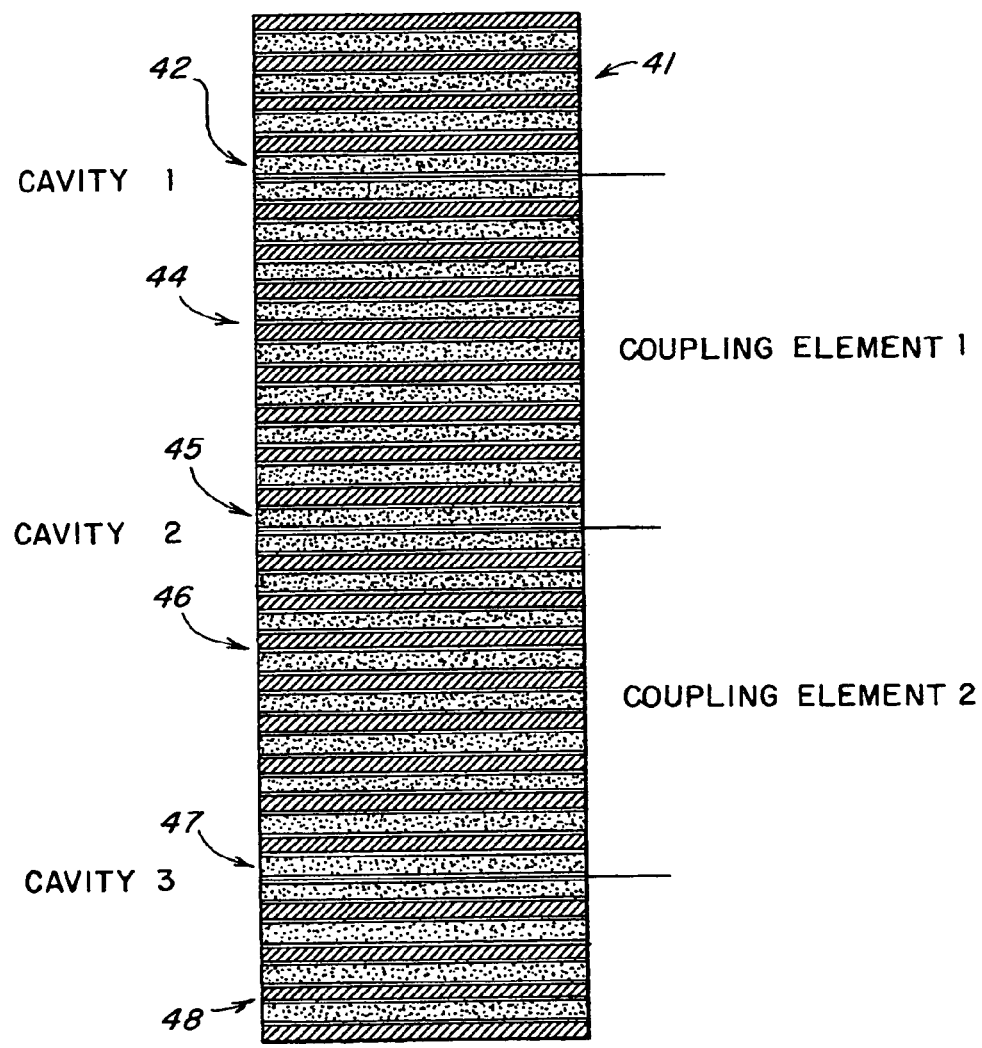
FIG. 3 is a schematic diagram of a multi-cavity structure.

FIG. 3 is a schematic diagram of a multi-cavity structure 41. The multi-cavity structure 41 includes optical cavities 42, 45, and 47 and coupling elements 44 and 46. Given that the multi-cavity structure 41 includes 3 optical cavities, it is consider a 3-cavity structure. In other embodiments, the invention can include more cavity structures. The cavities 42, 45, and 47 are coupled together through the coupling elements 44 and 46. Also, the number of coupling elements can also vary depending on the optical cavities being used.

FIG. 3 also shows each of the cavities 42, 45, and 47 as being thin film microcavities. However, other cavities structures can be used, such as DFB cavities or photonic crystal structures. Also, a combination of the different structures can be used in accordance with the invention, for example, a 3-cavity structure, which includes a thin film microcavity, a photonic crystal structure, and a DFB microcavity. Each of the various cavities individually must exhibit the properties described with reference to FIGS. 2a–2d. Other optical cavities, beside those described above, can also be used in accordance with the invention. These types of cavities must also demonstrate that they exhibit the properties described in FIGS. 2a–2d.

The coupling elements 44 and 46 are used to interconnect between the optical cavities 42, 45, and 47, and provide a path for electromagnetic signals leaving a first optical cavity to be directed to a second optical cavity. Also, the coupling elements 44 and 46 allow for mutual inter-mixing of the electromagnetic signals from any two optical cavities to occur within its structures, thus permitting mutual coupling between cavities.

In order to increase dispersion without sacrificing the signal bandwidth, it is important to use the multi-cavity system 41. The cavities 42, 48, and 50 are coupled through coupling element 42 and 44, which have sufficient coupling strengths to achieve the desired characteristics. For the 3-cavity structure 41, the coupling constant between the cavities is equal to 0.9 times the decay rate of a one-sided cavity. In other embodiments, the coupling constant can be varied depending on the number of coupled optical cavities. Also, the more optical cavities used in a multi-cavity structure, the dispersion associated with the multi-cavity also increases.

An arrangement of cavities of different types can also effect the coupling strength between the various cavities 42, 45, and 47 and their respective coupling constants. However, the coupling constants should not vary significantly from those arrangements that include optical cavities of the same type. The invention provides the flexibility to use different optical cavities without sacrificing signal bandwidth.

By tuning the frequency of each of the cavities in the multi-cavity structure 41, while keeping the signal frequency constant, it is then possible to achieve tuning in the dispersion properties. The tuning can be achieved in a variety of different mechanisms, such as through thermal, electrical, or mechanical means.

Another feature of the invention is the presence of large dispersion in high-transmission regions of the optical spectra. This feature allows for low-insertion loss operation. Moreover, with an embodiment using thin films filters at normal incidence, the invention can eliminate polarization mode dispersion associated with certain optical cavities. Since optical cavities can also be constructed in a waveguide geometry, such as photonic crystal microcavities or waveguide gratings, the invention can be designed to be miniaturized to a single wavelength scale. Therefore, allowing photonic circuits to be used in accordance with the invention.

Figure 4A:
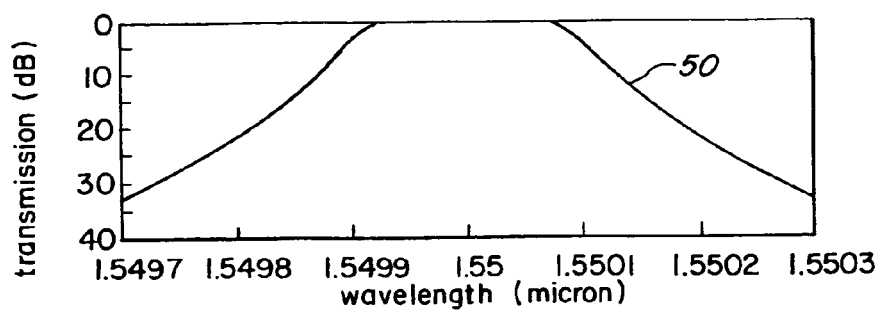
FIGS. 4a–4d are graphs demonstrating the characteristics of the multi-cavity structure.

FIGS. 4a–4d are graphs demonstrating the characteristics of the multi-cavity structure 41. FIG. 4a shows a graph 50 associated with the transmission characteristics of the multi-cavity 41. As discussed above, the multi-cavity 41 is a 3-cavity structure of thin film microcavities 42, 45, and 47, as shown in FIG. 3.

The range of transmission as shown in graph 50 is between approximately 0 and −50 dB. The resonant wavelength is at 1.55 μm. In comparison to the graph 34 of FIG. 2a, the range of frequencies with high transmission coefficients in graph 50 are much larger. This is accomplished by having each of the three optical structures 42, 45, and 47 has a resonant frequency at 1.55 μm. However, if each of the optical cavities structures 42, 45, and 47 are to have different resonant frequencies, the resultant frequency of the multi-cavity structure 41 will be different.

Figure 4B:
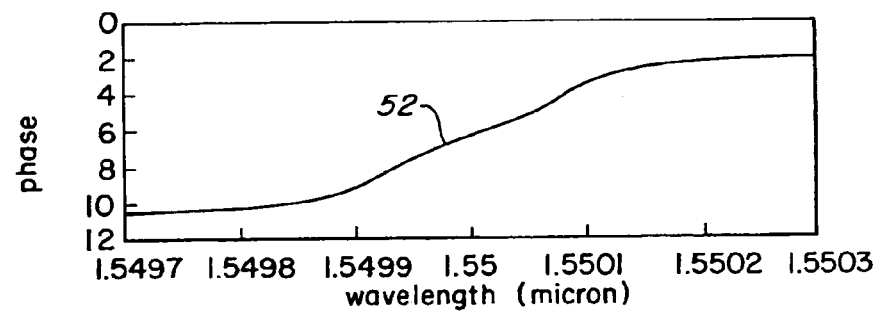

FIG. 4b shows a graph 52 associated with the phase of the multi-cavity structure 41. The range of the phase as shown in graph 52 is between approximately −11 radian and −2 radian. In comparison to the graph 36 of FIG. 2b, the phase of the multi-cavity structure 41 has a larger region. In general, the more optical cavities that are used in a multi-cavity structure, the more the phase will increase. Thus, the multi-cavity structure 41 can accommodate a larger range of phase as compared to a single cavity structure.

Figure 4C:
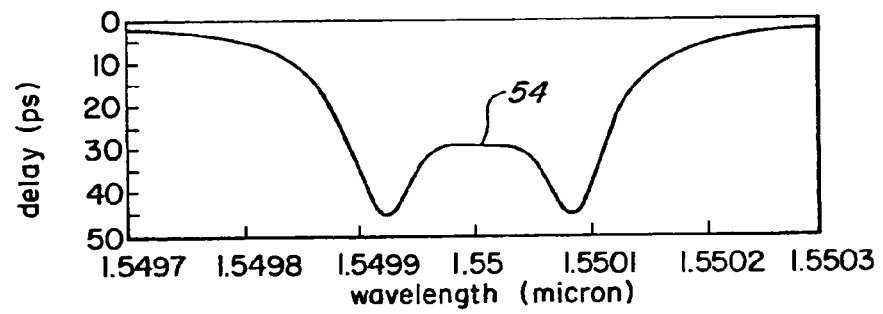

FIG. 4c shows a graph 54 associated with the delay of the multi-cavity structure 41. The range of the delay as shown in graph 54 is between −1 ps and −50 ps. In comparison to graph 38 of FIG. 2c, the range of the delay of the multi-cavity 41 is significantly larger then that of a single cavity structure. The larger the number of optical cavities used in a multi-cavity structure, the larger the range of delay will be. Also, graph 54 shows two minimum values at approximately 1.5499 μm and 1.5501 μm. The graph 52 further shows the delay does not vary very much around the resonant frequency.

Figure 4D:
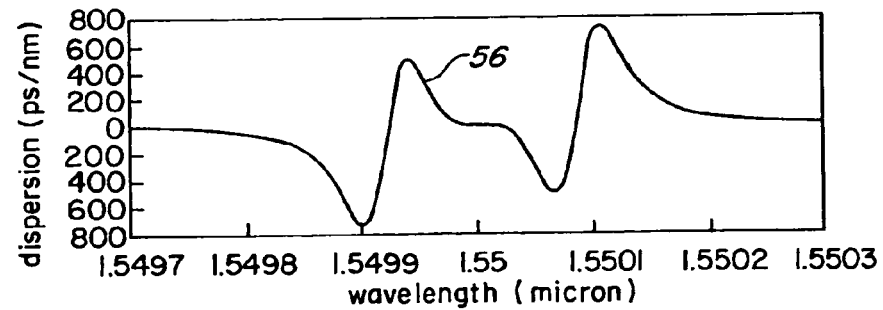

FIG. 4d shows a graph 56 associated with dispersion of the multi-cavity structure 41. The range of dispersion as shown in graph 56 is between 700 and −700 ps/nm. In comparison with FIG. 2d, the multi-cavity 41 has a larger range of dispersion. Also, the dispersion varies from −500 to 500 ps/nm monotonically with the wavelength range of approximately 0.01 nm around the resonant wavelength of 1.55 μm. Within the high transmission frequency range, high dispersion also occurs. The multi-cavity structure 41 can operate with minimal insertion while still achieving high dispersion.

Figure 5:
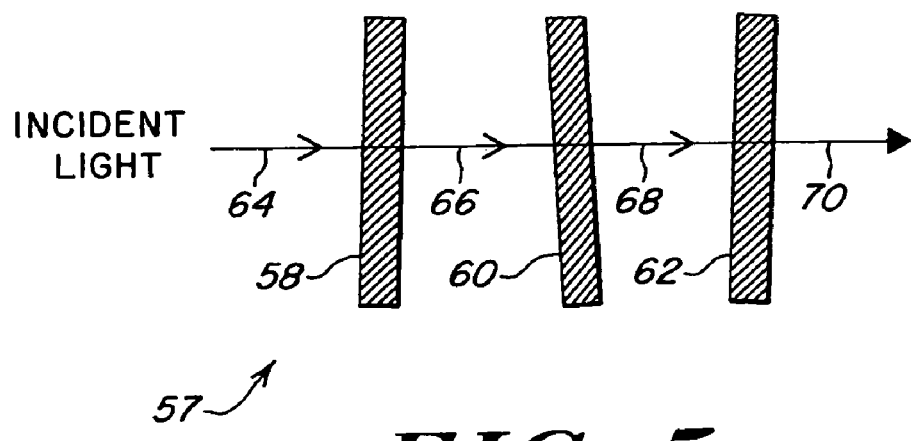
FIG. 5 is a schematic diagram of another embodiment of a multi-cavity for increasing dispersion.

FIG. 5 is a schematic diagram of another embodiment for increasing dispersion. A system 57 includes multi-cavity structure 58, 60, and 62. The multi-cavity structures 58, 60, and 62 are specifically arranged such that there are no mutual coupling among them. In this embodiment, the multi-cavity structures 58, 60 and 62 are tilted to ensure that no mutual coupling occurs. Other techniques to prevent mutual coupling can be used. Also, each of the structures 58, 60, and 62 is a thin film multi-cavity structure. Other types of multi-cavity structures can be used in this embodiment.

An incident light ray or electromagnetic signal 64 is directed to the first 58 of the multi-cavity structures 58, 60 and 62, and incorporates the dispersion properties associated with the multi-cavity structure 57. An electromagnetic signal 66 exits the multi-cavity structure 58, and is directed to the second multi-cavity structure 60. Within the second multi-cavity structure 60, the electromagnetic 66 further incorporates the dispersion properties associated the multi-cavity structure 60. An electromagnetic signal 68 exits the multi-cavity structure 60, and is directed to the third multi-cavity structure 62. That electromagnetic signal 68 further includes the dispersion properties of the multi-cavity structure 62.

The resultant electromagnetic signal 70 that passes through all of the multi-cavity structures 58, 60, and 62 is substantially dispersed, and exhibits large dispersion properties. The structure 57 allows for large dispersion to occur, and there is minimal insertion loss, because each of the multi-cavity structures 58, 60, and 62 has low insertion loss as well.

Because there is no mutual coupling between the multi-cavity structures, the electromagnetic signals 64, 66, and 68 that are received from each of the multi-cavity structures 58, 60, and 62 have not been exposed to a previous or successor multi-cavity structure. In this case, the total dispersion of the electromagnetic signal becomes the sum of the dispersion of the electromagnetic signal through each of the cavities 58, 60, and 62, respectively.

By tuning the frequency of each of the cavities in the multi-cavity structures 58, 60, and 62, while keeping the signal frequency constant, it is then possible to achieve tuning in the dispersion properties. The tuning can be achieved in a variety of different mechanisms, such as through thermal, electrical, or mechanical means.

The number of multi-cavity structures that can be used can vary. The more multi-cavity structures being used, the resultant light from the arrangement will be more dispersed. Also, these multi-cavity structures will need to be arranged so there are not mutual coupling.

The invention can be used to compensate optical signals in optical communications, such as fiber optic lines. The invention does not delineate the signal bandwidth to accomplish the task of tunably compensating an optical signal. The invention is versatile enough to be incorporated onto a chip, or be used in a stand-alone fashion.

Although the present invention has been shown and described with respect to several preferred embodiments thereof, various changes, omissions and additions to the form and detail thereof, may be made therein, without departing from the spirit and scope of the invention.

The invention claimed is:

1. A system for dispersion compensation, comprising:
a plurality of optical cavities with each including a specific resonant frequency and resonant linewidth, wherein said optical cavities comprise distributed feed back structures; and
at least one coupling element interconnecting said optical cavities, said at least one coupling element defining the coupling strength between the cavities;
wherein the optical cavities that are interconnected with said at least one coupled element form a multi-cavity structure, said multi-cavity structure generating appropriate dispersion properties for dispersion compensation purposes by tuning the resonant frequency of at least one of said optical cavities, while keeping the signal frequency of an optical signal constant.

2. The system of claim 1, wherein said multi-cavity structure adjusts dispersion by keeping the frequency of an electromagnetic signal constant and tuning the dispersion properties of said optical cavities.

3. A method of dispersion compensation comprising:
providing a plurality of optical cavities with each including a specific resonant frequency and resonant linewidth, wherein said optical cavities comprise distributed feed back structures;
providing at least one coupling element interconnecting said optical cavities, said at least one coupling element defining the coupling strength between the cavities;
forming a multi-cavity structure by interconnecting the optical cavities with said at least one coupling element; and
adjusting the overall dispersion of said multi-cavity structure by using certain properties of said optical cavities by tuning the resonant frequency of at least one of said optical cavities, while keeping the signal frequency of an optical signal constant.

4. The method of claim 3, wherein said properties include said resonant frequency, resonant linewidth, and said coupling strengths of said optical cavities.

5. A system for dispersion compensation comprising:
a plurality of multi-cavity structure that receives an electromagnetic signal and said electromagnetic signal is cascaded through said multi-cavity structures to perform dispersion compensation;
each of said multi-cavity structures comprising:
a plurality of optical cavities with each including a specific resonant frequency and resonant linewidth, wherein said optical cavities comprise distributed feed back structures; and
at least one coupling element interconnecting said optical cavities, said at least one coupling element defining the coupling strength between the cavities;
wherein said interconnection between the optical cavities forms a structure that permits adjusting the overall dispersion of said structure by using by tuning the resonant frequency of at least one of said optical cavities, while keeping the signal frequency of an optical signal constant; said multi-cavity structures are arranged such that no mutual coupling occurs between said multi-cavity structures.

6. The system of claim 5, wherein said multi-cavity structures each comprise a 3-cavity structure.

7. The system of claim 6, wherein said multi-cavity structures are arranged in a titled formation relative to each other to prevent mutual coupling.

* * * * *

UNITED STATES PATENT AND TRADEMARK OFFICE
CERTIFICATE OF CORRECTION

PATENT NO.         : 7,190,853 B2                                      Page 1 of 1
APPLICATION NO. : 10/178965
DATED              : March 13, 2007
INVENTOR(S)        : Joannopoulos et al.

It is certified that error appears in the above-identified patent and that said Letters Patent is hereby corrected as shown below:

Title page, item (75) Inventors: - delete – "Michal Lispon" and replace with -- Michal Lipson --

Signed and Sealed this

Eighth Day of May, 2007

JON W. DUDAS
*Director of the United States Patent and Trademark Office*